United States Patent
Minami et al.

(10) Patent No.: US 8,157,521 B2
(45) Date of Patent: Apr. 17, 2012

(54) WIND TURBINE GENERATOR AND METHOD OF CONTROLLING THE SAME

(75) Inventors: Tohru Minami, Tokyo (JP); Tetsuo Takebe, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 103 days.

(21) Appl. No.: 12/675,271

(22) PCT Filed: Feb. 10, 2010

(86) PCT No.: PCT/JP2010/051978
§ 371 (c)(1),
(2), (4) Date: Jun. 9, 2010

(87) PCT Pub. No.: WO2011/099128
PCT Pub. Date: Aug. 18, 2011

(65) Prior Publication Data
US 2011/0215576 A1 Sep. 8, 2011

(51) Int. Cl.
*F03D 7/04* (2006.01)
(52) U.S. Cl. .............. 416/1; 416/35; 416/37; 416/41; 416/61
(58) Field of Classification Search ............ 416/1, 35, 416/37, 41, 44, 47–49, 61; 290/44, 55
See application file for complete search history.

(56) References Cited

U.S. PATENT DOCUMENTS

| | | | |
|---|---|---|---|
| 2009/0047129 A1* | 2/2009 | Yoshida | 416/9 |
| 2010/0087960 A1* | 4/2010 | Hayashi et al. | 700/287 |
| 2011/0095537 A1* | 4/2011 | Numajiri | 290/55 |

FOREIGN PATENT DOCUMENTS

| | | | |
|---|---|---|---|
| EP | 2154362 A1 | | 2/2010 |
| JP | 58-094880 U | | 6/1983 |
| JP | 59-093972 A | | 5/1984 |
| JP | 09-317760 A | | 12/1997 |
| JP | 2005320891 A | | 11/2005 |
| JP | 2006057469 A | | 3/2006 |
| JP | 2008-286156 A | * | 11/2008 |
| JP | 2008291786 A | | 12/2008 |
| JP | 2008309097 A | | 12/2008 |
| WO | WO-2006/129509 A1 | * | 12/2006 |
| WO | WO-2009/150729 A1 | * | 12/2009 |

* cited by examiner

*Primary Examiner* — Christopher Verdier
(74) *Attorney, Agent, or Firm* — Kanesaka Berner & Partners

(57) ABSTRACT

There is provided a wind turbine generator and a method of controlling the same which can prevent the decline in power generation efficiency even when the generator is located where the wind is not always strong. The wind turbine generator mainly includes an anemometer, an anemoscope, a nacelle swiveling mechanism which turns a nacelle, and a control unit which controls the nacelle swiveling mechanism. The control unit controls the nacelle swiveling mechanism so as to swivel the nacelle based on the wind direction obtained from the measurement result of the anemoscope when the wind speed obtained from the measurement result of the anemometer is greater than a first threshold $V_{th1}$ which is smaller than a cut-in wind speed $V_{cut\_in}$, and controls the nacelle swiveling mechanism so as to stop the swiveling of the nacelle when the wind speed obtained from the measurement result of the anemometer is not greater than a first threshold $V_{th1}$.

8 Claims, 4 Drawing Sheets

WIND TURBINE GENERATOR AND METHOD OF CONTROLLING THE SAME

RELATED APPLICATIONS

The present application is a national phase of, PCT/JP2010/51978, filed Feb. 10, 2010, the disclosure of which is hereby incorporated by reference herein in its entirety.

BACKGROUND OF THE INVENTION

1. Field of the Invention

The present invention relates to a wind turbine generator and a controlling method for controlling the wind turbine generator, and especially to a wind turbine generator and a method for controlling the wind turbine generator in which a nacelle is swiveled according to measurement results from an anemoscope and an anemometer.

2. Description of the Related Art

In recent years, from a view point of preserving the global environment, the use of wind turbine generators to generate reusable energy has become popular.

In general, a wind turbine generator comprises a rotor head equipped with blades, a nacelle accommodating a drive train and a rotation axis, and a tower supporting the nacelle. To improve power generation efficiency, most wind turbine generators adopt yaw rotation rotating the nacelle in the wind direction and a pitch control rotating the blades in a pitch direction.

As this type of a wind turbine generator, there is a wind turbine generator in which an azimuth of the nacelle is controlled based on measurement results from the anemometer and anemoscope provided on the nacelle. For instance, Patent Document 1 discloses to generate electric power efficiently by controlling the nacelle to follow the wind direction measured by the anemoscope when a fluctuation range of the wind direction measured by the anemoscope is smaller than a first parameter and a fluctuation range of the wind speed measured by the anemometer is smaller than a second parameter.

In this type of a wind turbine generator, the anemoscope is usually located in the downstream side of the wind turbine and thus the wind direction after blowing against the turbine blade is measured, which create measurement deviation. Therefore, a distribution curve of the fluctuation range of the power output (fluctuation range of the wind direction) relative to the wind direction measured by the anemoscope and the azimuth of the nacelle is obtained in advance and the measurement result of the anemoscope is corrected by using the fluctuation range of the peak in the distribution curve as a correction amount (e.g. Patent Document 2).

[Related Patent Documents]
[Patent Document 1] JP2008-3090997A
[Patent Document 2] JP9-317760A (published in 1997)

SUMMARY OF THE INVENTION

Neither Patent Document 1 or Patent Document 2 discloses how to turn the nacelle when the wind speed is smaller than the cut-in wind speed and there is almost no wind, but in most types of the wind turbine generators, the nacelle is not controlled so as to follow the wind direction measured by the anemoscope when the wind speed is smaller than the cut-in wind speed.

However, if the nacelle is not directed at the wind direction when the wind gets stronger, it is not possible to promptly change to the normal operation when the wind speed is at the cut-in wind speed or faster. Especially, for the wind turbine generator located in the areas where it is not always windy, it is difficult to generate power efficiently unless the nacelle is directed to the wind direction.

The present invention has been devised in view of the above situation and it is an object of the present invention to provide a wind turbine generator and a method of controlling the wind turbine generator that can reduce the decline of power generation efficiency even when the wind turbine generator is located where the wind is not always strong.

The present invention provides a wind turbine generator comprising: a nacelle; an anemoscope; an anemometer; a nacelle swiveling mechanism which turns the nacelle; and a control unit which controls the nacelle swiveling mechanism so that, when wind speed obtained from a measurement result of the anemometer exceeds a first threshold which is lower than a cut-in wind speed, swiveling of the nacelle is performed based on a wind direction obtained from a measurement result of the anemoscope and when the wind speed obtained from the measurement result of the anemometer is not greater than the first threshold, the swiveling of the nacelle is stopped.

Herein "wind speed obtained from a measurement result of the anemometer" can be the wind speed measured by the anemometer or a true wind speed obtained by performing some sort of corrections to the wind speed measured by the anemometer. In a similar manner, "wind direction obtained from a measurement result of the anemoscope" can be the wind direction measured by the anemoscope or a true wind direction obtained by performing some sort of corrections to the wind direction measured by the anemoscope.

In the above wind turbine generator, even when the wind speed obtained from a measurement result of the anemometer is lower than the cut-in wind direction, as long as the wind speed is greater than the first threshold, the swiveling of the nacelle is performed based on the wind direction obtained from a measurement result of the anemoscope. Therefore, when the wind becomes stronger and the wind speed exceeds the cut-in wind speed, the direction of the nacelle is substantially in the direction of the wind and the prompt transition to the normal operating mode at the cut-in wind speed or faster is possible. Even when the wind turbine generator is located where the wind is not always strong, the decline of the power generation efficiency is avoided.

Further, when the wind speed obtained from the measurement result of the anemometer is not greater than the first threshold, the swiveling of the nacelle is stopped. When there is almost no wind, the wind direction is unstable and the nacelle must be frequently swiveled to direct the nacelle at the wind direction. Thus, when the wind speed obtained from the measurement result of the anemometer is not greater than the first threshold, the swiveling of the nacelle is stopped so as to avoid unnecessary frequent swiveling of the nacelle and also save a large amount of electricity to do so. Therefore, even when the wind turbine generator is located where the wind is not always strong, the decline of the power generation efficiency is avoided.

With the above wind turbine generator, it is preferable that, in a state that the swiveling of the nacelle is stopped, when the wind speed obtained from the measurement result of the anemometer is not less than a second threshold which is greater than the first threshold and less than the cut-in wind speed, the control unit controls the nacelle swiveling mechanism so as to start again the swiveling of the nacelle based on the wind direction obtained from the measurement result of the anemoscope.

In this manner, when the wind speed obtained from the measurement result of the anemometer is not less than a second threshold which is greater than the first threshold and less than the cut-in wind speed, the swiveling of the nacelle is resumed so that when the wind becomes stronger and the wind speed exceeds the cut-in wind speed, the direction of the nacelle is substantially in the direction of the wind and the prompt transition to the normal operating mode at the cut-in wind speed or faster is possible. Therefore, even when the wind turbine generator is located where the wind is not always strong, the decline of the power generation efficiency is further suppressed.

The wind turbine generator described above further comprises a pitch driving mechanism which rotates the blades to open or close in a pitch direction, wherein, when the wind speed obtained from the measurement result of the anemometer is less than the cut-in wind speed, the control unit controls the pitch driving mechanism to operate in an idling mode in which there is an upper limit to a pitch angle of the blades, and when the wind speed obtained from the measurement result of the anemometer is not less than the cut-in wind speed, the control unit controls the pitch driving mechanism to operate in a normal operating mode in which a pitch angle of the blades is allowed up to a full-open state.

In this manner, when the wind speed obtained from the measurement result of the anemometer is less than the cut-in wind speed, the pitch angle of the blade is regulated in the idling mode in which there is an upper limit to a pitch angle of the blades so that the prompt transition to the normal operating mode can be performed when the wind gets strong and exceeds the cut-in wind speed.

The wind turbine generator preferably further comprises a wind direction correcting device which corrects the wind direction measured by the anemoscope based on a deviation of the wind direction measured by the anemoscope from a direction of the nacelle at which a maximum power curve of the wind turbine is obtained, wherein the control unit controls the nacelle swiveling mechanism so that when the wind speed obtained from the measurement result of the anemometer is greater than the first threshold, the nacelle follows the wind direction corrected by the wind direction correcting device.

It is common to arrange the anemoscope on the nacelle located behind the blade. Thus, the wind that is detected by the anemoscope is the wind that has blown on the blade, resulting in that the wind direction measured by the anemoscope is different from an actual wind direction. Therefore, as described above, a wind direction correcting device is provided to correct the wind direction measured by the anemoscope based on a deviation of the wind direction measured by the anemoscope from a direction of the nacelle at which a maximum power curve of the wind turbine is obtained, and thus the nacelle is directed at the wind direction more precisely and the power generation efficiency is improved.

The present invention provides a method of controlling a wind turbine generator which is equipped with a nacelle, an anemometer, an anemoscope and a nacelle swiveling mechanism for swiveling the nacelle, the method comprising the steps of: swiveling the nacelle by the nacelle swiveling mechanism based on a wind direction obtained from a measurement result of the anemoscope when a wind speed obtained from measurement result of the anemometer exceeds a first threshold which is lower than a cut-in wind speed; and stopping the swiveling of the nacelle by the nacelle swiveling mechanism when the wind speed obtained from the measurement result of the anemometer is not greater than the first threshold.

According to this method of controlling the wind turbine generator, even when the wind speed obtained from measurement result of the anemometer is lower than the cut-in wind speed, as long as it exceeds the first threshold, the nacelle is swiveled based on a wind direction obtained from a measurement result of the anemoscope so that when the wind becomes stronger and the wind speed exceeds the cut-in wind speed, the direction of the nacelle is substantially in the direction of the wind and the prompt transition to the normal operating mode at the cut-in wind speed or faster is possible. Therefore, even when the wind turbine generator is located where the wind is not always strong, the decline of the power generation efficiency is suppressed.

Further, according to this method of controlling the wind turbine generator, the swiveling of the nacelle is stopped when the wind speed obtained from the measurement result of the anemometer is not greater than the first threshold. By this, unnecessary frequent swiveling of the nacelle is avoided and also a large amount of electricity for swiveling the nacelle is saved. Therefore, even when the wind turbine generator is located where the wind is not always strong, the decline of the power generation efficiency is avoided.

With the above method of controlling the wind turbine generator, it is preferable to further comprise the step of resuming the swiveling of the nacelle, after the step of stopping the swiveling of the nacelle, based on the wind direction obtained from the measurement result of the anemoscope when the wind speed obtained from the measurement result of the anemometer is not less than a second threshold which is greater than the first threshold and less than the cut-in wind speed.

In this manner, the swiveling of the nacelle is resumed when the wind speed obtained from the measurement result of the anemometer is not less than a second threshold which is greater than the first threshold and less than the cut-in wind speed so that once the wind becomes stronger and the wind speed exceeds the cut-in wind speed, the direction of the nacelle is substantially in the direction of the wind and the prompt transition to the normal operating mode at the cut-in wind speed or faster is possible.

The method of controlling the wind turbine generator which further comprises a pitch driving mechanism which rotates the blades to open or close in a pitch direction, further comprises the steps of: regulating a pitch angle of the blades by the pitch driving mechanism in an idling mode in which there is an upper limit to a pitch angle of the blades, when the wind speed obtained from the measurement result of the anemometer is less than the cut-in wind speed; and regulating the pitch angle of the blade by the pitch driving mechanism in a normal operating mode in which a pitch angle of the blades is allowed up to a full-open state, when the wind speed obtained from the measurement result of the anemometer is not less than the cut-in wind speed.

In this manner, the pitch angle of the blades is regulated in the idling mode with an upper limit to the pitch angle of the blades even when the wind speed obtained from the measurement result of the anemometer is less than the cut-in wind speed, so as to perform a smooth transition to the normal operating mode when the wind gets stronger and the wind speed exceeds the cut-in wind speed.

With the above method of controlling the wind turbine generator, it is preferable to further comprise the steps of correcting the wind direction measured by the anemoscope, based on a deviation of the wind direction measured by the anemoscope from a direction of the nacelle at which a maximum power curve of the wind turbine generator is obtained, and wherein, in the step of swiveling the nacelle, the nacelle is swiveled so as to follow the wind direction corrected in the step of correcting the wind direction.

In this manner, the wind direction correcting device is provided and the wind direction measured by the anemoscope is corrected based on the deviation of the wind direction measured by the anemoscope from a direction of the nacelle at which a maximum power curve of the wind turbine generator is obtained, and wherein, in the step of swiveling the nacelle, so that the nacelle is more precisely directed at the direction of the wind and improves the power generation efficiency.

In the present invention, even when the wind speed obtained from measurement result of the anemometer is lower than the cut-in wind speed, as long as it exceeds the first threshold, the nacelle is swiveled based on a wind direction obtained from a measurement result of the anemoscope so that when the wind becomes stronger and the wind speed exceeds the cut-in wind speed, the direction of the nacelle is substantially in the direction of the wind and the prompt transition to the normal operating mode at the cut-in wind speed or faster is possible. Moreover, further, according to this method of controlling the wind turbine generator, the swiveling of the nacelle is stopped when the wind speed obtained from the measurement result of the anemometer is not greater than the first threshold. By this, unnecessary frequent swiveling of the nacelle is avoided and also a large amount of electricity for swiveling the nacelle is saved. Therefore, even when the wind turbine generator is located where the wind is not always strong, the decline of the power generation efficiency is avoided.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
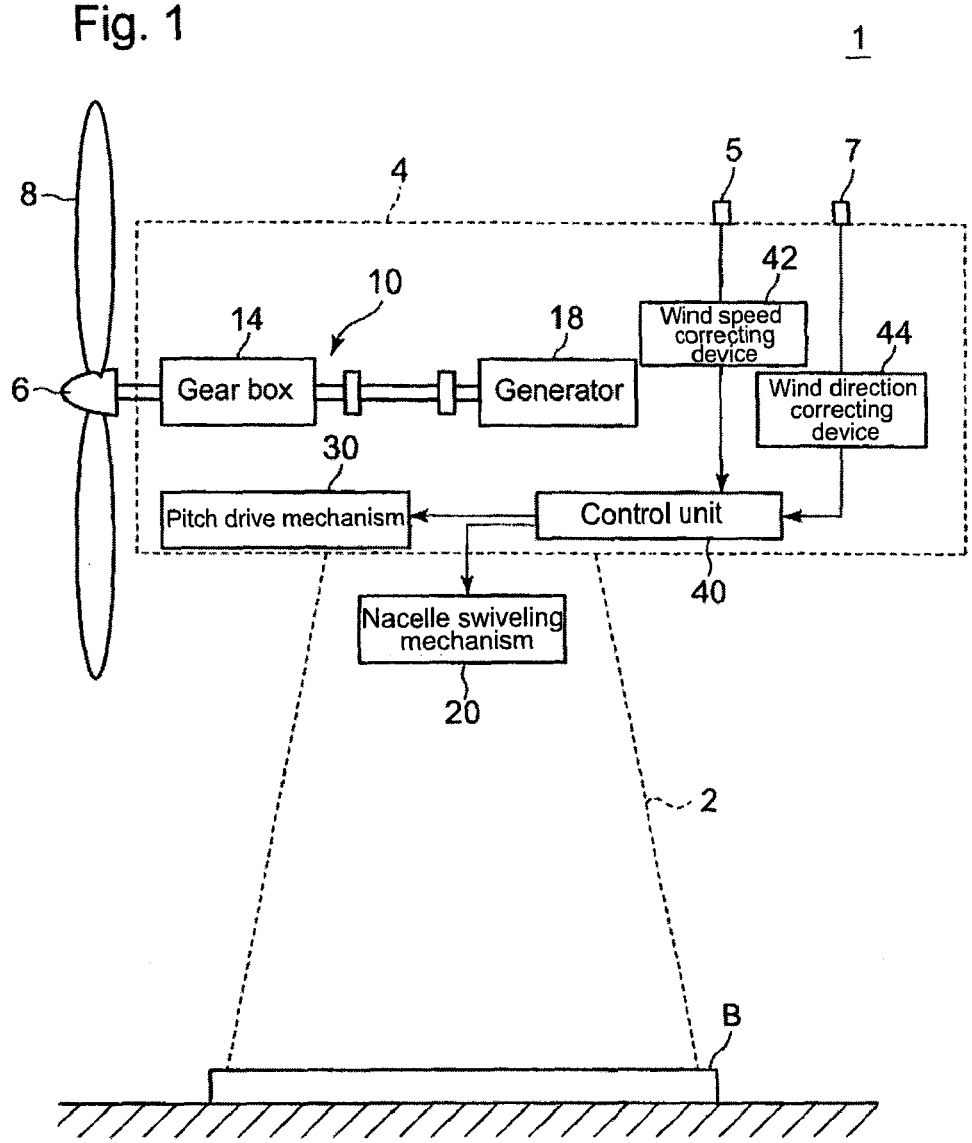
FIG. 1 is a view showing an example of the overall structure of a wind turbine generator.

FIG. 1 is a view showing an example of the overall structure of a wind turbine generator. A wind turbine generator 1 mainly includes, as shown in FIG. 1, a tower 2 provided to stand on a foundation B, a nacelle 4 provided on the upper end of the tower 2, a rotor head 6 provided on the nacelle 4, and a plurality of blades 8 attached to the rotor head 6.

As shown in FIG. 1, the tower 2 has a column-like shape extending upwardly (to the upper end of FIG. 1) from the foundation B. The tower 2, for example, can be made from a single column-like member or made from a plurality of units aligned in upright direction and coupled to each other. If the tower 2 is made from the plurality of units, the nacelle 4 is provided on the unit located on the top of the tower 2.

The nacelle 4 supports the rotor head 6, and accommodates a drive train 10 housing the gear box 14, and a generator 18, etc. On the nacelle 4, is an anemometer 5 for measuring the wind speed of the surrounding and an anemoscope for measuring the wind direction of the surrounding. It is preferable that the wind speed and wind direction measured by the anemometer 5 and anemoscope are corrected by a wind speed correcting device 42 and a wind direction correcting device 44 respectively as described later.

Inside the nacelle 4, a control unit 40 for controlling each part of the wind turbine generator 1 is provided. The control unit 40 receives a wind speed value and a wind direction value having been corrected by the wind speed correcting device 42 and the wind direction correcting device 44 respectively and sends instructions to a nacelle swiveling mechanism 20 or pitch drive mechanism 30. The operations of each part of the wind turbine generator 1 being controlled by the control unit 40 will be explained later. FIG. 1 illustrates an example in which the control unit 40 is located in the nacelle 4 but the location of the control unit 40 should not be limited. For instance, the control unit 40 may be provided under the tower 2.

Figure 2:
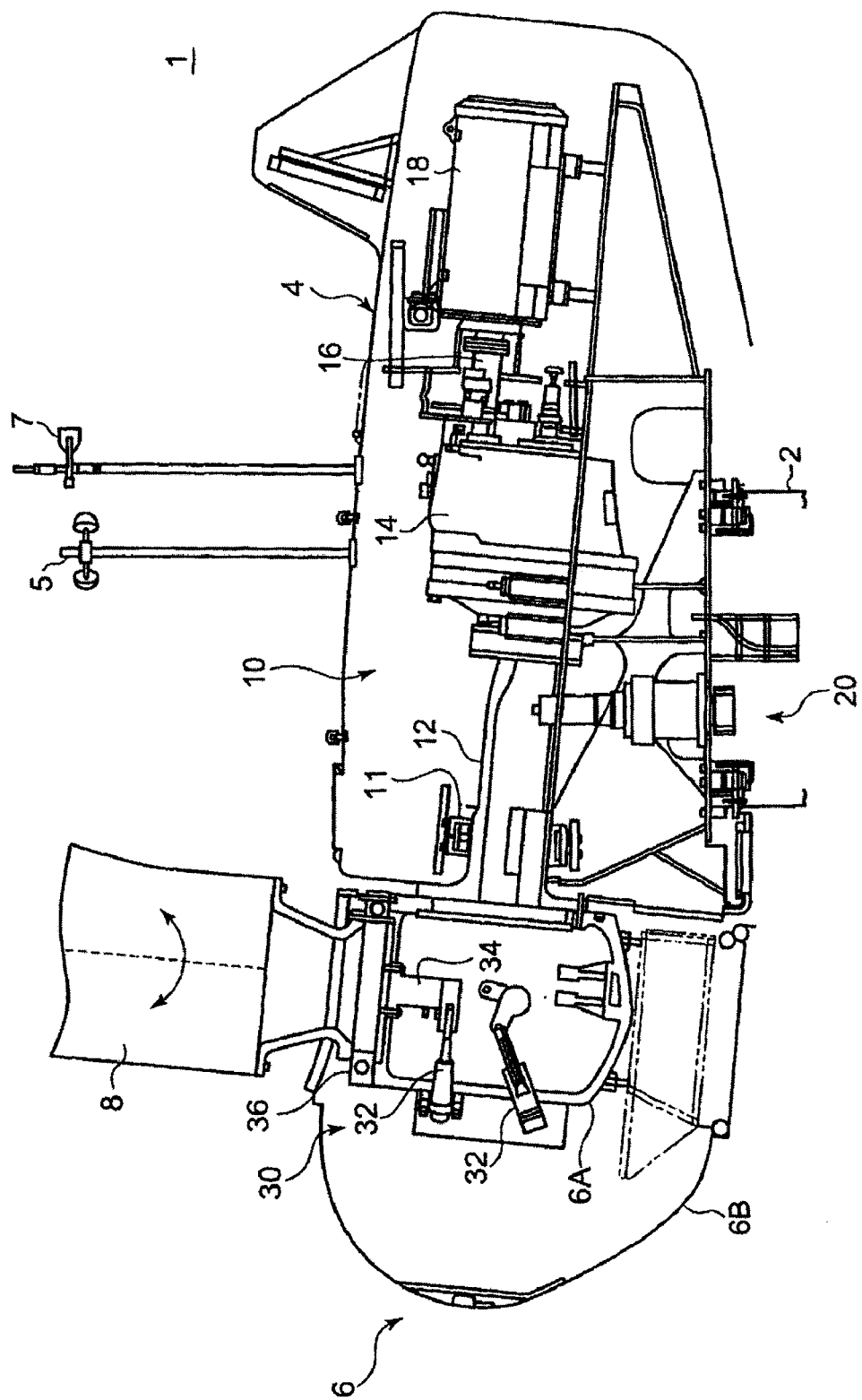
FIG. 2 is a side view showing a detailed structure of each part of the wind turbine generator of FIG. 1.

A detailed structure of each part of the wind turbine generator 1 is explained below. FIG. 2 shows an example of the detailed structure of each part of the wind turbine generator.

FIG. 2 shows a detailed view of the drive train 10 and the generator 18 inside the nacelle 4. The drive train 10 includes a main shaft 12 that is connected to a rotor hub 6A of a rotor head 6, a gear box 14 connected to the main shaft 12 and a coupling 16 that couples the gear box 14 to the generator 18. In the wind turbine generator 1, when the blade 8 receives the wind, the main shaft 12 rotates with the rotor hub 6A, and the rotation speed of the main shaft 12 is increased by the gear box 14 and then is inputted to the generator 18 via the coupling 16.

Further, a nacelle rotating mechanism 20 for rotating the nacelle 4 in the yaw direction is provided on a lower part of the nacelle 4.

Figure 3:
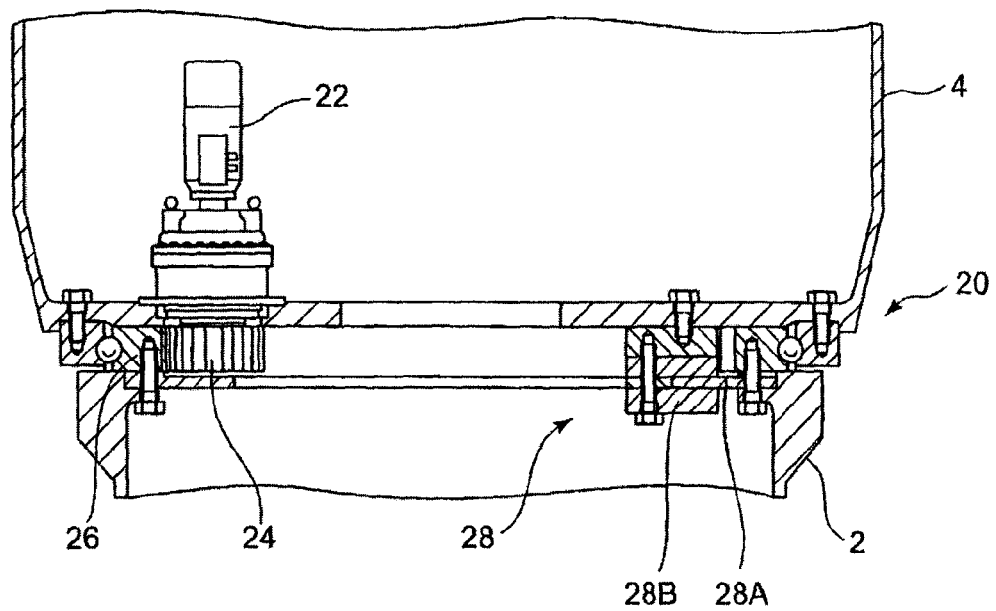
FIG. 3 is a cross-sectional view showing an example of a nacelle rotating mechanism.

FIG. 3 is a sectional view showing an example of the nacelle rotating mechanism 20. As shown in FIG. 3, the nacelle rotating mechanism 20 includes a yaw motor 22, a pinion 24 rotated by driving of the yaw motor 22, an internal gear 26 meshed with the pinion 24, and a yaw brake mechanism 28 equipped with a brake disk 28A and a brake shoe 28B. In this nacelle rotating mechanism 20, the yaw motor 22, the pinion 24 and the brake shoe 28B are held to the nacelle 4 side, while the internal gear 26 and the brake shoe 28B are held to the tower 2 side.

Thus, if the yaw motor 22 is driven, the pinion 24 is rotated so that the nacelle 4 can rotate to yaw direction. If the brake shoe 28B bites the brake disk 28A, the yaw rotation of the nacelle 4 is broken. The yaw motor and the yaw brake mechanism 28 are controlled by the control unit 40.

The rotor head 6 shown in FIG. 1 is rotatably supported on the nacelle 4 with a rotation axis substantially extending horizontal direction, and includes a rotor hub 6A equipped with blades 8 and a head capsule 6B for covering this rotor hub 6A.

Further, as shown in FIG. 2, the rotor hub 6A is equipped with a pitch driving device 30 that rotates the blades 8 around the rotation axis (in a direction designated by an arrow in FIG. 2) and varies the pitch angle of the blades 8.

As shown in FIG. 2, the pitch drive device 30 includes a cylinder 32 and a rod 34 connected to the blades 8. The blades 8 are rotatably supported by a rod bearing 36 for rotating in the direction of the pitch. Due to this structure, when the rod 34 is rotated by the cylinder 32, the blades 8 rotate with the rod 34 in the pitch direction. The pitch drive devices 30 are provided in each of the blades 8 and connect together by a link mechanism that is not shown, and may be arranged so that pitch angle control of the blades 8 are interconnected.

Figure 4:
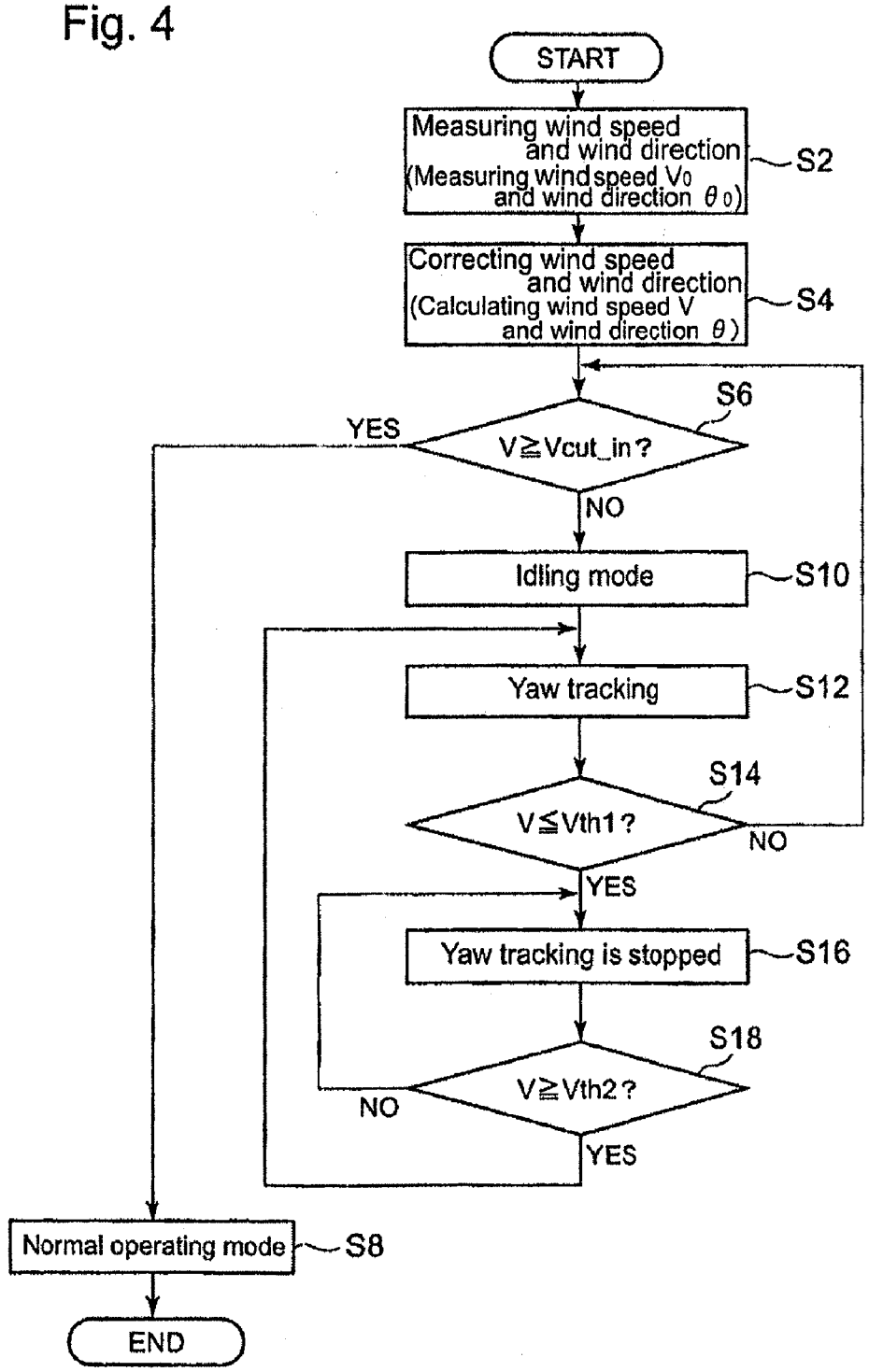
FIG. 4 is a flow chart showing an example of the operations of each part of the wind turbine generator of FIG. 1.

Next, the operations of each part of the wind turbine generator 1 being controlled by the control unit 40 are explained. FIG. 4 is a flow chart showing an example of the operations of each part of the wind turbine generator 1.

As shown in FIG. 4, a wind speed $V_0$ and a wind direction $\theta_0$ of the surrounding are measured by the anemometer 5 and the anemoscope 7 respectively in the wind turbine generator 1 (step S2).

As illustrated in FIG. 1 and FIG. 2, it is common to arrange the anemometer 5 and anemoscope 7 of the wind turbine generator 1 in the nacelle 4 which is located behind the blade 8 and thus the wind after blowing against the turbine blade is measured by the anemometer 5 and anemoscope 7, which create measurement deviation from the actual wind speed and the wind direction.

Thus, it is preferable to correct the wind speed $V_0$ and the wind direction $\theta_0$ measured by the anemometer 5 and the anemoscope 7 respectively by the wind speed correcting device 42 and the wind direction correcting device 44 and further to calculate an actual wind speed V and an actual wind direction $\theta$ (step S4). For example, a correlation of the measured wind speed $V_0$ measured by the anemometer 5 and the actual wind speed (raw wind speed) may be obtained in advance, and correct the wind speed $V_0$ based on the correlation in the wind speed correcting device 42. In a similar manner, a correlation of the measured wind direction $\theta_0$ measured by the anemoscope 7 and the actual wind direction (raw wind direction) may be obtained in advance, and correct the measured wind direction $\theta_0$ based on the correlation in the wind direction correcting device 44.

The correlation used when correcting the wind direction $\theta_0$ in the wind direction correcting device 44 may be obtained as a deviation of the wind direction $\theta_0$ measured by the anemoscope from a direction of the nacelle 4 at which a maximum power curve of the wind turbine generator 1 is obtained. The power curve is a relation of the wind speed and output at a predetermined pitch angle and has such characteristic that, when the direction of the nacelle 4 coincides with the actual wind direction, a maximum power curve is obtained and is larger than the case in which the direction of the nacelle 4 and the actual wind direction do not match. In another word, the direction of the nacelle 4 at which the maximum power curve of the wind turbine generator 1 is obtained corresponds with the actual wind direction (raw wind direction). That is, the above deviation shows the correlation of the wind direction $\theta_0$ measured by the anemoscope 7 and the actual wind direction (raw wind direction).

The wind speed V and the wind direction $\theta$ obtained in the above-described manner are sent to the control unit 40, where it is determined whether the wind speed V is not less than a cut-in wind direction $V_{cut\_in}$.

When the wind speed is not less than the cut-in wind direction $V_{cut\_in}$ (determined as YES in step S6), the wind turbine generator 1 switches the operation to the normal operating mode (step S8). Specifically, under the control of the control unit 40, the blades 8 are rotated by the pitch drive mechanism 30 (the pitch angle is made bigger) while the nacelle is swiveled by the nacelle swiveling mechanism 20 so as to follow the wind direction $\theta$ and power is generated. In the normal operating mode, the pitch angle of the blades is allowed up to a full-open state without any upper limit.

In contrast, when the wind speed V is lower than the cut-in wind speed $V_{cut\_in}$ (determined as NO in step S6), the wind turbine generator 1 switches the operation to the idling mode (step S10). In the idling mode, there is an upper limit to a pitch angle of the blades 8 and under the control of the control unit 40, the pitch drive mechanism controls the pitch angle of the blades 8 in the range that does not exceed the upper limit Next, in a step S12, under the control of the control unit 40, the nacelle 4 is swiveled to follow the wind direction $\theta$ by the nacelle swiveling mechanism 20 (i.e. yaw tracking is performed).

Next, in a step S14, it is determined whether or not the wind speed V is not greater than the first threshold $V_{th1}$. In this process, the first threshold $V_{th1}$ is lower than the cut-in wind speed $V_{cut\_in}$ and in another word, the relation satisfies the inequation of $0<V_{th1}<V_{cut\_in}$.

And, when the wind speed is not greater than the first threshold $V_{th1}$ (determined as YES in step S14), the process advances to a step S16, and under the control of the control unit 40, the swiveling of the nacelle 4 is stopped by the nacelle swiveling mechanism 20 (i.e. the yaw tracking is stopped). On the other hand, when the wind speed V is greater than the first threshold $V_{th1}$ (determined as NO in the step 14), the process returns to the step S6 where it is determined again whether or not the wind speed V is not less than the cut-in wind speed $V_{cut\_in}$.

After the swiveling of the nacelle 4 is stopped in the step S16, it is determined whether or not the wind speed V is not less than a second threshold $V_{th2}$ (step S18). Herein, the second threshold $V_{th2}$ is lower than the cut-in wind speed Vcut-in and greater than the first threshold $V_{th1}$, in another word it satisfies the inequation of $V_{th1}<V_{th2}<V_{cut\_in}$.

And when the wind speed V is not less than the $V_{th2}$ (determined as YES in a step S18), the process returns to the step S12 and the yaw tracking is resumed so as to direct the nacelle 4 in the wind direction $\theta$. On the other hand, when the wind speed V is less than the second threshold $V_{th2}$ (determined as NO in the step S18), the process returns to the step S16 and the wind turbine generator is kept in such state that the swiveling of the nacelle 4 is stopped.

The example of correcting the wind speed and the wind direction by the wind speed correcting device 42 and the wind direction correcting device 44 in the step S4 has been explained above in reference to FIG. 4. However, it are possible to skip the step S4 and use the wind speed $V_0$ and the wind direction $\theta_0$ measured by the anemometer 5 and the anemoscope 7 without correcting the measurement to perform the subsequent steps. In this case, in the steps S6, S14 and S18, the relationships of the wind speed $V_0$ and each of the cut-in wind speed $V_{cut\_in}$, the first threshold $V_{th1}$ and the second threshold $V_{th2}$ is determined and in the steps S8 and S12, the yaw tracking is performed so as to direct the nacelle 4 at the wind direction $\theta 0$ measured by the anemoscope 7.

As described above, in the present invention, the wind turbine generator of the present invention comprises the anemoscope 5; the anemometer 7; the nacelle swiveling mechanism 20 which turns the nacelle 4; and the control unit 40 which controls the nacelle swiveling mechanism 20 so that, when the wind speed (V or $V_0$) obtained from a measurement result $V_0$ of the anemometer 5 exceeds the first threshold $V_{th1}$ which is lower than the cut-in wind speed $V_{th1}$, the swiveling of the nacelle 4 is performed based on the wind direction ($\theta$ or $\theta_0$) obtained from the measurement result $\theta_0$ of the anemoscope 7 and when the wind speed (V or $V_0$) obtained from the measurement result (V or $V_0$) of the anemometer is not greater than the first threshold $V_{th1}$, the swiveling of the nacelle 4 is stopped.

In the above wind turbine generator 1 of the present embodiment, even when the wind speed (V or $V_0$) obtained from a measurement result of the anemometer 5 is lower than the cut-in wind speed $V_{cut\_in}$, as long as the wind speed (V or $V_0$) is greater than the first threshold $V_{th1}$, the swiveling of the nacelle 4 is performed based on the wind direction (θ or $\theta_0$) obtained from a measurement result of the anemoscope 7. Therefore, when the wind becomes stronger and the wind speed exceeds the cut-in wind speed $V_{cut\_in}$, the direction of the nacelle is substantially in the direction of the wind and the prompt transition to the normal operating mode at the cut-in wind speed or faster is possible. Even when the wind turbine generator is located where the wind is not always strong, the decline of the power generation efficiency is avoided.

Moreover, when the wind speed (V or $V_0$) obtained from the anemometer 5 is not greater than the first threshold $V_{th1}$, the swiveling of the nacelle 4 is stopped. When there is almost no wind, the wind direction is unstable and the nacelle 4 must be frequently swiveled to direct the nacelle at the wind direction. Thus, when the wind speed (V or $V_0$) obtained from the measurement result of the anemometer is not greater than the first threshold $V_{th1}$, the swiveling of the nacelle 4 is stopped so as to avoid unnecessary frequent swiveling of the nacelle 4 and also save a large amount of electricity to do so. Therefore, even when the wind turbine generator 1 is located where the wind is not always strong, the decline of the power generation efficiency is avoided.

In the present invention, it is preferable that, in a state that the swiveling of the nacelle 4 is stopped, when the wind speed (V or $V_0$) obtained from the measurement result of the anemometer 5 is not less than the second threshold $V_{th2}$ which is greater than the first threshold $V_{th1}$ and less than the cut-in wind speed $V_{cut\_in}$, the control unit 40 controls the nacelle swiveling mechanism 20 so as to start again the swiveling of the nacelle based on the wind direction (θ or $\theta_0$) obtained from the measurement result of the anemoscope 7.

In this manner, when the wind speed (V or $V_0$) obtained from the measurement result of the anemometer 5 is not less than a second threshold $V_{th1}$ which is greater than the first threshold $V_{th2}$ and less than the cut-in wind speed $V_{cut\_in}$, the swiveling of the nacelle 4 is resumed so that when the wind becomes stronger and the wind speed exceeds the cut-in wind speed $V_{cut\_in}$, the direction of the nacelle is substantially in the direction of the wind and the prompt transition to the normal operating mode at the cut-in wind speed or faster is possible.

The wind turbine generator 1 of the present embodiment further comprises the pitch driving mechanism 30 which rotates the blades 8 to open or close in a pitch direction, wherein, when the wind speed obtained from the measurement result of the anemometer 5 is less than the cut-in wind speed $V_{cut\_in}$, the control unit 40 controls the pitch driving mechanism 30 to operate in an idling mode in which there is an upper limit to a pitch angle of the blades, and when the wind speed obtained from the measurement result of the anemometer 5 is not less than the cut-in wind speed $V_{cut\_in}$, the control unit 40 controls the pitch driving mechanism 30 to operate in a normal operating mode in which a pitch angle of the blades is allowed up to a full-open state.

In this manner, when the wind speed obtained from the measurement result of the anemometer is less than the cut-in wind speed $V_{cut\_in}$, the pitch angle of the blade is regulated in the idling mode in which there is an upper limit to a pitch angle of the blades so that the prompt transition to the normal operating mode can be performed when the wind gets strong and exceeds the cut-in wind speed.

Furthermore, the wind turbine generator 1 of the present embodiment preferably further comprises the wind direction correcting device 44 which corrects the wind direction $\theta_0$ measured by the anemoscope 7 based on the deviation of the wind direction $\theta_0$ measured by the anemoscope 7 from the direction of the nacelle 4 at which a maximum power curve of the wind turbine generator 1 is obtained, wherein the control unit 40 controls the nacelle swiveling mechanism 20 so that when the wind speed (V or $V_0$) obtained from the measurement result of the anemometer 5 is greater than the first threshold $V_{th1}$, the nacelle follows the wind direction θ corrected by the wind direction correcting device 44.

In this manner, the wind direction correcting device 44 is provided to correct the wind direction $\theta_0$ measured by the anemoscope 7 based on the deviation of the wind direction $\theta_0$ measured by the anemoscope 7 from the direction of the nacelle 4 at which the maximum power curve of the wind turbine generator 1 is obtained, and thus the nacelle is directed at the wind direction more precisely and the power generation efficiency is improved.

Hereinabove, one example of the present invention has been explained. However, it will be obvious that various changes or modifications may be made to the extent that does not depart from the scope of the invention.

The invention claimed is:

1. A wind turbine generator comprising:
   a nacelle;
   an anemoscope;
   an anemometer;
   a nacelle swiveling mechanism which turns the nacelle; and
   a control unit which controls the nacelle swiveling mechanism so that, when wind speed obtained from a measurement result of the anemometer exceeds a first threshold which is lower than a cut-in wind speed, swiveling of the nacelle is performed based on a wind direction obtained from a measurement result of the anemoscope and when the wind speed obtained from the measurement result of the anemometer is not greater than the first threshold, the swiveling of the nacelle is stopped.

2. The wind turbine generator according to claim 1, wherein, in a state that the swiveling of the nacelle is stopped, when the wind speed obtained from the measurement result of the anemometer is not less than a second threshold which is greater than the first threshold and less than the cut-in wind speed, the control unit controls the nacelle swiveling mechanism so as to start again the swiveling of the nacelle based on the wind direction obtained from the measurement result of the anemoscope.

3. The wind turbine generator according to claim 1, further comprising a pitch driving mechanism which rotates the blades to open or close in a pitch direction, wherein, when the wind speed obtained from the measurement result of the anemometer is less than the cut-in wind speed, the control unit controls the pitch driving mechanism to operate in an idling mode in which there is an upper limit to a pitch angle of the blades, and when the wind speed obtained from the measurement result of the anemometer is not less than the cut-in wind speed, the control unit controls the pitch driving mechanism to operate in a normal operating mode in which a pitch angle of the blades is allowed up to a full-open state.

4. The wind turbine generator according to claim 3, further comprising a wind direction correcting device which corrects the wind direction measured by the anemoscope based on a deviation of the wind direction measured by the anemoscope from a direction of the nacelle at which a maximum power curve of the wind turbine is obtained, wherein the control unit controls the nacelle swiveling mechanism so that when the wind speed obtained from the measurement result of the anemometer is greater than the first threshold, the nacelle follows the wind direction corrected by the wind direction correcting device.

5. A method of controlling a wind turbine generator which is equipped with a nacelle, an anemometer, an anemoscope and a nacelle swiveling mechanism for swiveling the nacelle, the method comprising the steps of:
    swiveling the nacelle by the nacelle swiveling mechanism based on a wind direction obtained from a measurement result of the anemoscope when a wind speed obtained from a measurement result of the anemometer exceeds a first threshold which is lower than a cut-in wind speed; and
    stopping the swiveling of the nacelle by the nacelle swiveling mechanism when the wind speed obtained from the measurement result of the anemometer is not greater than the first threshold.

6. The method of controlling the wind turbine generator according to claim 5, further comprising the step of resuming the swiveling of the nacelle, after the step of stopping the swiveling of the nacelle, based on the wind direction obtained from the measurement result of the anemoscope when the wind speed obtained from the measurement result of the anemometer is not less than a second threshold which is greater than the first threshold and less than the cut-in wind speed.

7. The method of controlling the wind turbine generator which further comprises a pitch driving mechanism which rotates the blades to open or close in a pitch direction, according to claim 5, the method further comprising the steps of:
    regulating a pitch angle of the blades by the pitch driving mechanism in an idling mode in which there is an upper limit to a pitch angle of the blades, when the wind speed obtained from the measurement result of the anemometer is less than the cut-in wind speed; and
    regulating the pitch angle of the blades by the pitch driving mechanism in a normal operating mode in which a pitch angle of the blades is allowed up to a full-open state, when the wind speed obtained from the measurement result of the anemometer is not less than the cut-in wind speed.

8. The method of controlling the wind turbine generator according to claim 7, further comprising the steps of correcting the wind direction measured by the anemoscope, based on a deviation of the wind direction measured by the anemoscope from a direction of the nacelle at which a maximum power curve of the wind turbine generator is obtained, and
    wherein, in the step of swiveling the nacelle, the nacelle is swiveled so as to follow the wind direction corrected in the step of correcting the wind direction.

* * * * *